United States Patent [19]

Muroya et al.

[11] Patent Number: 5,156,232

[45] Date of Patent: Oct. 20, 1992

[54] OPERATION CONTROLLING APPARATUS OF THE PASSENGER WORKING MACHINE

[76] Inventors: Fumio Muroya; Yoshiaki Kotani; Naoya Toida; Kazunobu Sato, all of 4-1, 1-chome Chuo, Wako Shi, Saitama Ken, Japan

[21] Appl. No.: 754,179

[22] Filed: Aug. 27, 1991

Related U.S. Application Data

[63] Continuation of Ser. No. 508,795, Apr. 12, 1990, abandoned.

[30] Foreign Application Priority Data

Apr. 13, 1989 [JP] Japan .................................. 1-42522

[51] Int. Cl.⁵ ............................................. B60K 28/04
[52] U.S. Cl. ....................................... 180/273; 307/101
[58] Field of Search ................ 180/273, 272, 53.1, 180/271; 307/10.1

[56] References Cited

U.S. PATENT DOCUMENTS

| | | | |
|---|---|---|---|
| 1,846,873 | 2/1932 | Johns | 180/273 |
| 2,250,754 | 7/1941 | Dooley | 180/273 |
| 3,500,946 | 3/1970 | Boyajian | 180/273 |
| 3,838,748 | 10/1974 | Gray et al. | 180/273 |
| 4,051,915 | 10/1977 | Behrens | 180/271 |
| 4,294,327 | 10/1981 | Howard | 180/273 |
| 4,317,500 | 3/1982 | Bening | 180/273 |
| 4,389,154 | 6/1983 | Minor et al. | 180/273 |
| 4,607,199 | 8/1986 | Krueger et al. | 180/273 |
| 4,651,018 | 3/1987 | Peterson, Jr. | 180/273 |
| 4,655,313 | 4/1987 | Hicks | 180/273 |

*Primary Examiner*—Karin L. Tyson
*Attorney, Agent, or Firm*—Eckert Seamans Cherin & Mellott

[57] ABSTRACT

An operation controlling apparatus for a passenger operated machine such as a tractor, snowmobile or the like. The apparatus includes an engine cut-off mechanism which terminates engine operation if an operator is expelled from the machine seat for a pre-determined time. Relatively short, intermittent periods of displacement of an operator from the seat, such as when travelling over rough or bumpy terrain, will not terminate engine operation. After emergency engine stoppage, the apparatus requires the machine be placed in a start waiting state, for instance by disengaging the clutch or when the transmission is placed in neutral, before the engine can be re-started.

9 Claims, 2 Drawing Sheets

OPERATION CONTROLLING APPARATUS OF THE PASSENGER WORKING MACHINE

This is a continuation of application Ser. No. 508,795, filed Apr. 12, 1990 now abandoned.

BACKGROUND OF THE INVENTION

1. Field of the Invention

The present invention relates to controlling operation of a passenger-operated machine such as a lawn mower, tractor, snow plough or the like, in general to render the machine inoperable when the operator is unseated. More particularly, the invention relates to an operation controlling apparatus wherein whether the operator is seated or not seated is detected by a seat detecting means whose output maintains a disabled state of the machine until the apparatus assumes a start waiting state; and, the disabled engine state is assumed only after the operator is unseated for more than a predetermined time period.

2. Prior Art

Operation controlling apparatus for engine-driven passenger-operated machines such as lawn mowers, tractors and the like are disclosed, for example, in the following patents.

U.S. Pat. No. 4,051,915—Behrens discloses an interlock circuit for a tractor which prevents starting unless the transmission is in neutral and the power take-off is disengaged, and also prevents the tractor from being driven when the parking brake is engaged. A first switch detects the neutral status of a variable speed transmission. Another switch detects the disengaged state of the power take-off clutch. A further switch detects the released (operating) state of the parking brake. The engine can be operated only when all the noted switches are disposed in their respective detecting states. The presence of the operator on the seat is not detected, and accordingly the engine is not stopped when the operator is unseated.

U.S. Pat. No. 4,317,500—Bening discloses a safety start and shutdown device for a vehicle having an electrically activated power take-off. The disclosed device disables the power take-off clutch when the operator is not seated, as detected by a seat switch, and also disables starting or operation of the engine. The device detects the neutral state of the variable speed transmission such that the engine cannot be started or the power take-off engaged when the vehicle is in gear.

Devices according to the foregoing description are inconvenient in that the engine may be stopped automatically whenever the operator rises from the seat, even instantaneously as caused for example when the operator bounces on the seat when operating the vehicle over an uneven surface. To overcome this problem a safety interlock can be provided with a timer circuit arranged to delay response to the "ON" and "OFF" positions of the instantaneous seat switch.

This arrangement allows the operator to be supported comfortably on the seat in a stable and high position, even though this arrangement is more prone to bouncing of the operator relative to the seat support. The seating switch also can be arranged outside of the seat (between the seat support and the chassis rather than between the operator and the seat support) to be less sensitive to bouncing of the operator relative to the seat. However such a switch is less sensitive to whether the operator is indeed seated. In this case, even when the engine ought to be stopped due to unseating of the operator as mentioned above, the seat switch cannot stop the engine automatically. A switch disposed outside the seat often will repeatedly turn "ON" and "OFF" momentarily due to vibration induced motion. The engine produces a vertical oscillation of the seat support relative to the seat switch, and the seat switch responds to the oscillating weight of the seat rather than to the weight of the operator. Therefore it is necessary that special consideration be give to the weight of the seat and the resilient means supporting it.

SUMMARY OF THE INVENTION

An object of the present invention is to provide an operation controlling apparatus for a passenger-operated machine wherein the above-mentioned problems are solved. The engine continues to operate when the operator rises from the seat instantaneously, for example due to bouncing when operating the machine over an uneven surface, in spite of the use of a comfortable seat support spring arrangement as described. According to the invention, it is not necessary to have an extremely sensitive seat switch in order to accomplish this. The apparatus locks in a stopping sequence, and the engine stops automatically, after unseating of the operator is detected for more than a predetermined time period.

The foregoing object is achieved according to the invention in a controlling apparatus for a passenger-operated machine with a seating detector because the engine stopping means for disabling the engine and maintaining a stopped state is timed to allow the engine of the machine to be stopped, and assumes a start waiting state when the unseated state continues for more than the predetermined time, as determined by a signal from the seating detector.

In this manner the engine stops automatically when the operator is separated from the seat for more than the predetermined time. Until the predetermined time elapses, the engine continues to operate. The control apparatus returns to the driving state if the operator returns to the seat within the predetermined time period. Therefore, when the operator rises from the seat instantaneously such as due to operation over an uneven surface, smooth operation can be maintained and the work can proceed without stopping the engine each time.

When the operator is separated from the seat for more than the predetermined time and the control apparatus assumes the engine stopping state, the engine is stopped automatically and the control locks in the stopping state until a subsequent waiting state is completed. Consequently, the engine is stopped quickly when a stop is necessary. The engine stopping state is maintained until the subsequent starting operation is completed.

BRIEF DESCRIPTION OF THE INVENTION

The operational cutoff according to the invention is explained with reference to exemplary embodiments as shown in the drawings, wherein:

FIG. 1 is a summary elevation view showing a the passenger-operated machine according to the invention, for example a lawn tractor; and, FIG. 2 is a schematic diagram showing the operating control circuit.

DETAILED DESCRIPTION OF THE PREFERRED EMBODIMENTS

Figure 1:
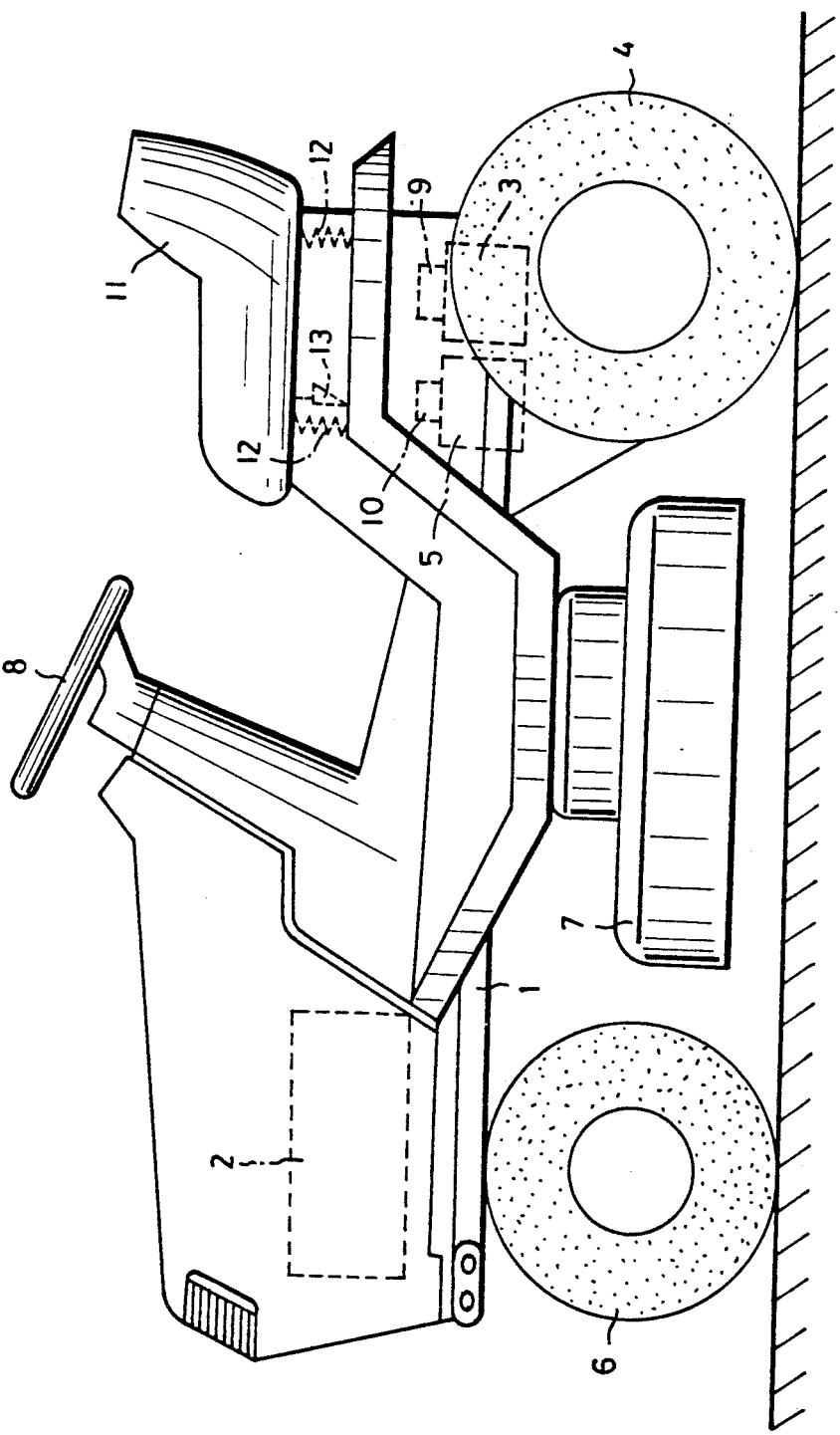

The operational cutoff of the invention is applied in the following description with respect to a riding lawn mower or lawn tractor, as shown generally in FIG. 1. The invention also applies to other forms of passenger-operated vehicles. The vehicle includes an engine 2, typically an internal combustion engine with an ignition and one or more spark plugs, the engine typically being disposed at the front of the frame 1. The driving force developed by engine 2 is transmitted to the driving (rear) wheels 4, at the lower part of the frame 1. The wheels 4 are coupled to the engine through a variable speed gear arrangement or transmission 3. Also, the driving force of the engine 2 typically is transmitted to a working apparatus such as grass cutter 7, mounted at the central part of the frame between the front wheels 6 and the rear wheels 4. Power to the working apparatus is transmitted through a power take-off clutch 5. The front wheel 6 is arranged for controllable steering via handle 8, whereby the vehicle is operably mobile.

A power take-off detector switch 10 is responsive to the present state of the power take-off for the working apparatus. A neutral detector 9 detects transmission status and is responsive to the variable speed transmission. The detector switches 9, 10 respectively detect the disengaged or neutral position of the variable speed transmission 3 and disengaged state of the power take-off clutch 5. Neutral detector 9 can comprise a limit switch which, for example, is "ON" (closed) when the shift lever o similar control element (not shown) is disposed in the neutral position, and is "OFF" (open) when the lever is disposed in any position other than the neutral position, i.e., when the driving wheels are engaged. Similarly, the power take-off detector 10 is arranged to switch "ON" (closed) when the clutch lever (not shown) is in the disengaged position and switches "OFF" (open) when the clutch lever is positioned to engage.

The operator's seat 11 is mounted resiliently to the frame by at least one spring 12, the depicted embodiment having two or more springs movably supporting the seat 11. A seating detector 13 senses the weight of the operator on the seat, being attached between the frame and the bottom of seat 11. The seating detector 13 can also comprise a limit switch, for example, and is mounted such that when the operator sits on the seat and the seat 11 sinks due to the operator's weight against the resilience of springs 12, the limit switch is thereby operated and the seating detector is switched "ON" (closed). The seating detector switches "OFF" (open) when the seat is raised above the operating position of the limit switch by springs 12, e.g., when the operator's weight is absent because the operator has left the seat.

Figure 2:
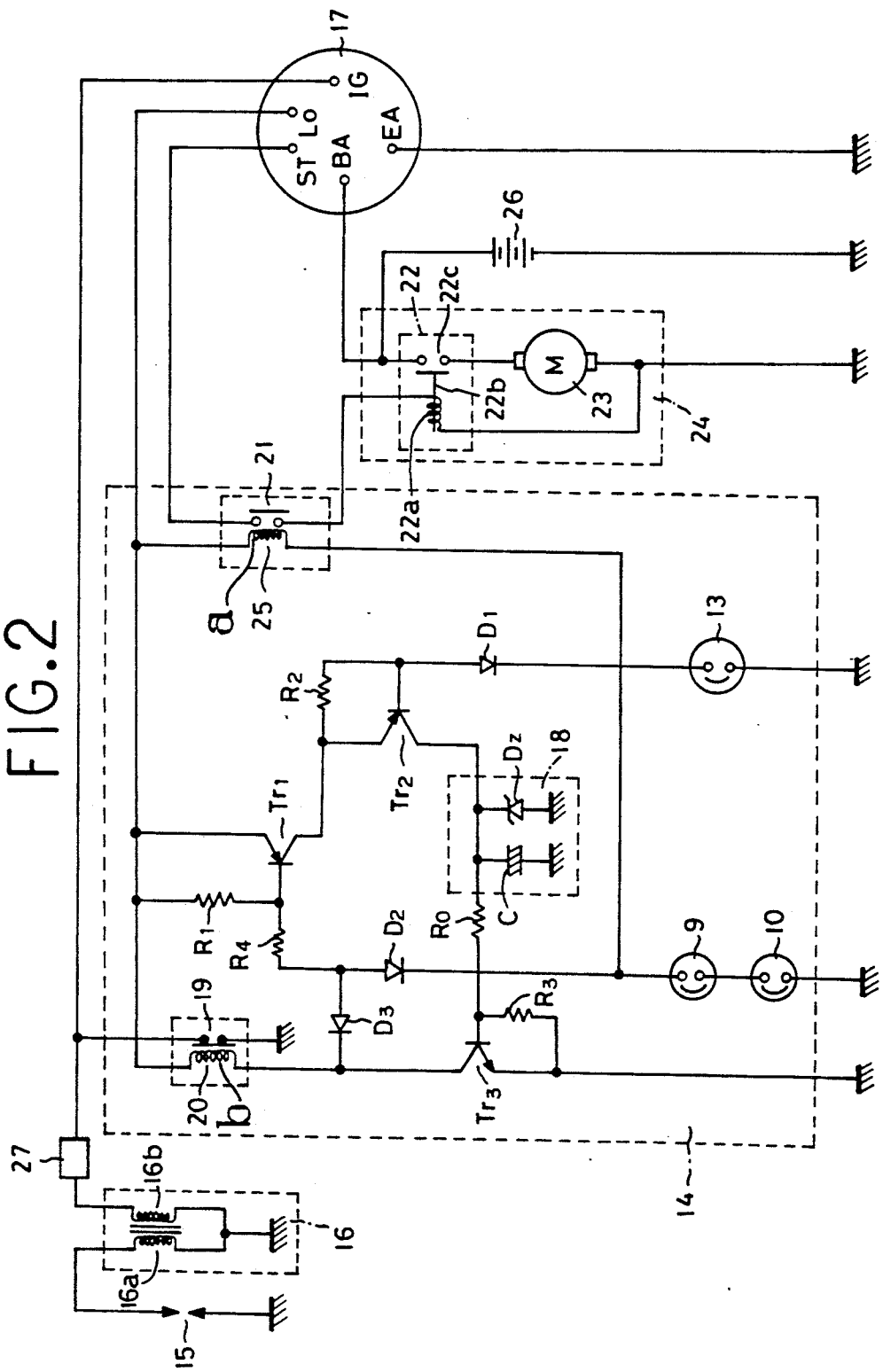

When the operator's weight is absent from seat 11 for more than a predetermined time period, the operational cutoff disables the engine via the controlling apparatus shown schematically in FIG. 2. The controlling apparatus includes an engine stopping means 14, which is associated with the ignition line coupled to the sparkplug(s) 15. The engine stopping means operates as follows.

The sparkplug(s) 15 are connected to an ignition coil operated by an ignition device 27, and arc electrically from a "hot" side to ground, for igniting the fuel in the engine. The hot side of the ignition line is connected to the terminal IG of a combination switch 17 through the ignition coil 16, which has a primary coil 16a and a secondary coil 16b for stepping up the voltage produced via ignition unit 27.

As shown in FIG. 2, the emitter of transistor $Tr_1$ is connected to terminal $L_o$ of combination switch 17. The emitter of transistor $Tr_2$ is connected to the collector of transistor $Tr_1$; the collector of transistor $Tr_2$ is connected to the base of transistor $Tr_3$ through resistance $R_o$; and, the emitter of transistor $Tr_3$ is grounded.

Biasing resistances $R_1$, $R_2$ and $R_3$ are connected respectively between the emitters and bases of each of the transistors $Tr_1$, $Tr_2$ and $Tr_3$. The base of transistor $Tr_2$ is connected to one of the contacts of seating detector 13 through diode $D_1$, and the other contact of the seat detector 13 is grounded.

The cathode of zener diode $D_z$, i.e., a constant voltage element, is connected to the collector of transistor $Tr_2$, and the anode of the zener diode is grounded. Condenser C is connected between the collector of transistor $Tr_2$ and ground. The zener diode $D_z$ and the condenser C together form an off-delay circuit 18 which delays switching of transistor $Tr_3$ for a predetermined time period after a change of state of the seat detector switch 13.

The base of transistor $Tr_1$ is connected to the anode of the diode $D_2$ through resistance $R_4$, and the transmission status detector 9 and the power take-off status detector 10 are connected in series between the cathode of diode $D_2$ and ground. Also, the anode of the diode $D_3$ is connected to the anode of diode $D_2$, and the cathode of the said diode $D_3$ is connected to the collector of transistor $Tr_3$.

The circuit shown activates the coil of electromagnetic relay 20, which can be designated the b coil as part of a b automatic return. Relay contacts 19, which are normally closed and are opened by energizing relay 20, are connected between terminal IG of the combination switch 17 (i.e., the supply voltage to ignition means 27) and ground, such that in the stopping state the circuit grounds the ignition to prevent operation of the engine. One side of electromagnetic coil 20, controlling contact 19, is connected to the emitter of transistor $Tr_1$. The other side of coil 20 is connected to the collector of transistor $Tr_3$.

Another electromagnetic coil 25, which can be designated the a relay as part of an a automatic return, controls contacts 21. Contacts 21 are connected at one side to the terminal ST of the combination switch 17, and at the other side are coupled to ground through the coil 22a of an electromagnetic switch 22. Electromagnetic switch 22 when energized closes contacts 22c, whereupon the circuit assumes an "ON" state in that automatic return operating element 22b is advanced via excitation of coil 22a to bridge across contacts 22c. One side of contacts 22c of electromagnetic switch 22 is connected to the BA terminal of the combination switch 17, and the other side of contacts 22c is connected to the starting motor 23. The other side of the starting motor 23 is grounded. Further, the positive terminal of battery 26 is connected to the BA terminal of combination switch 17, and the negative terminal of the battery 26 is grounded. Electromagnetic switch 22 and starting motor 23 constitute the starting apparatus 24 of the engine.

One side of electromagnetic coil 25 on the a return side is connected with the terminal $L_o$ of the combination switch 17, and the other side of electromagnetic coil 25 is connected to the cathode of the diode $D_2$.

These connections are for energizing coil 25 and thereby closing contacts 22c during starting.

The EA terminal of the combination switch 17 is grounded. The connection modes of combination switch 17 are indicated in Table No. 1, as follows:

TABLE 1

|       | EA (Gnd.) | BA (+V) | IG (Ign) | Lo | ST |
|-------|-----------|---------|----------|----|----|
| OFF   | ———————————————— |         |    |    |
| ON    |           | ——————————————— |    |    |
| Start |           | ————————————————————————————— |

Operation of the circuit as shown proceeds as follows for starting the engine and upon unseating of the operator. First of all, the BA terminal of the combination switch 17 is connected with the ST terminal, the $L_o$ terminal and the IG terminal, for preparing to start the engine. In this state, provided the power take-off clutch 5 is disengaged and the variable speed transmission 3 is in neutral (i.e., neutral status detector 9 and power take-off detector 10 are both "ON" or closed), the return contact 2 closes due to excitation of electromagnetic coil 25. Therefore the engine assumes the start waiting state (i.e., the starting function is enabled). The BA terminal of the combination switch 17 is then connected with the ST terminal of combination switch 17 by moving the combination switch 17 into the starting position. Coil 22a of the electromagnetic switch 22 is thus excited and contacts 22c close. Therefore, the starting motor 23 is energized by battery 26 and the engine starts.

Assuming the vehicle is then operated in the normal mode, the neutral detector 9 and/or the power take-off detector 10 change state when the vehicle is put in gear and/or the working apparatus 7 is engaged. Transistor $Tr_1$ changes from the "OFF" mode to the "ON" mode and begins to conduct. While the operator remains seated on seat 11 in this situation, the seating detector switch 13 remains "ON", and transistor $Tr_2$ is therefore "ON" and also conducts. When this situation is assumed originally (i.e., when transistor $Tr_2$ first begins to conduct), condenser C begins to charge. Other things remaining unchanged, condenser C continues to charge, up to the voltage defined by zener diode $D_z$. When transistor $Tr_2$ turns "ON" and condenser C charges, transistor $Tr_3$ turns "ON" as well. Therefore, electromagnetic coil 20 is excited, opening normally closed contacts 19, and spark plug 15 is thus enabled. Accordingly, after the engine 2 starts (i.e., after transistor $Tr_3$ turns "ON" to open contacts 19), so long as the neutral detector 9 and the power take-off detector 10 remain open, namely during operation of the lawn mower or the like, and provided the operator remains seated on the seat 11 (i.e., the seating detector 13 remains "ON" or closed), the transistor $Tr_3$ conducts and the engine continues to drive by maintaining a state wherein ignition is possible at spark plug 15 because contacts 19 are not grounding the ignition device 27.

Assuming the vehicle is operated over an uneven surface and the operator rises instantaneously, the seating detector switch 13 turns "ON" and "OFF" within a short period of time. In this case, when the seating detector switch 13 turns "OFF" (open), transistor $Tr_2$ ceases to conduct. Condenser C then discharges into the base of transistor $Tr_3$, and assuming that transistor $Tr_2$ remains "OFF," transistor $Tr_3$ continues to conduct for a time while condenser C discharges. When condenser C has been discharged, transistor $Tr_3$ turns "OFF," which occurs after a predetermined time defined by the values of the condenser C, resistor $R_o$, and the base-emitter resistance of transistor $Tr_3$. A delay time of about one to two seconds is adequate.

If the operator becomes seated again within the predetermined time, transistor $Tr_2$ turns "ON" again, transistor $Tr_3$ continues to conduct and condenser C is again charged through transistor $Tr_2$. That is to say, so long as the seating detector switch 13 is closed again within the predetermined time after it is opened, transistor $Tr_3$ remains "ON", and the ignition remains operable. The engine 2 continues to drive.

If the operator remains unseated for longer than the predetermined time, transistor $Tr_3$ turns "OFF" when condenser C has become sufficiently discharged. Consequently, coil 20 is de-energized and normally closed contacts 19 ground the ignition apparatus 27. The spark plug 15 cannot spark and engine 2 stops. In this case, when the transistor $Tr_3$ turns "OFF" even momentarily, regardless of whether the seating detector switch 13 turns "ON," for example due to vibration with the inertial rotation of the engine, the spark plug remains grounded due to the connection of points $L_o$ and IG in the combination switch.

As described above, when transistor $Tr_3$ turns "OFF" and the engine 2 stops, in order that the transistor $Tr_1$ may turn "OFF" and as needed for allowing engine 2 to be started, the transmission 3 must placed in the neutral position and the power take-off clutch 5 must be placed in the intercepting (disengaged) state. The neutral detector 9 and the power take-off status detector 10 are then both closed or "ON". It is then necessary to use the combination switch 17 to move through the start waiting position and the starting position to again start engine 2.

When the engine is stopped deliberately, e.g., after completion of the work, the combination switch 17 can be turned "OFF", whereupon power to the ignition coil 16 is grounded by connection of terminal IG and terminal EA. In this case, as in the case wherein the engine is to be restarted after unseating of the operator for longer than the predetermined time, the combination switch must be moved through the start waiting state while the transmission 3 is in neutral and the power take-off 5 is disengaged.

The foregoing exemplary embodiment of the invention, wherein a limit switch is used for each of detector switches 9, 10 and 13 is not intended to be limiting. Other forms of detectors are also possible whereby the neutral position of the transmission or variable speed gear 3, the disengaged or intercepting state of the power take-off clutch 5, and the seated status of the operator can be detected.

Also, the riding lawn mower is only an example of the type of passenger operated vehicle to which the invention is applicable. Other vehicles, for example snow-removing machines and the like, are also advantageously equipped with the apparatus of the invention.

What is claimed is:

1. An operation controlling apparatus for a passenger operated machine having an engine, at least one transmission and an operator's seat, comprising:
   a neutral detector operable to detect a neutral position of the at least one transmission and any state other than the neutral position, the neutral position being characterized by disengagement of the engine from at least one driving wheel of the machine;

a seating detector operable to detect whether or not an operator of the machine is seated on the seat;

a circuit coupled to the neutral detector and to the seating detector, the circuit being coupled to an engine disable means operable to disable the engine when said neutral detector is in a state detecting any position of the transmission other than said neutral position of the transmission and the seating detector continues to detect an unseated state of the operator for more than a predetermined time, and the circuit being operable to assume a start waiting state when said neutral detector detects neutral position of the transmission after said predetermined time, the engine disable means maintaining a stopped status of the engine in the start waiting state and preventing starting until the neutral detector detects the neutral position of the transmission and the seating detector detects that an operator of the machine is seated on the seat.

2. The operation controlling apparatus according to claim 1, wherein the at least one transmission includes a variable speed transmission for coupling the engine to driving wheels of the machine.

3. The operation controlling apparatus according to claim 1, wherein the at least one transmission includes a power take-off associated with a power take-off clutch, and further comprising a power take-off detector operable to detect a disengaged state of the power take-off clutch, and wherein said start waiting state of the circuit is attained upon the power take-off detector detecting disengagement of the power take-off clutch.

4. The operation controlling apparatus according to claim 3, wherein the at least one transmission includes a power take-off associated with a power take-off clutch, and further comprising a power take-off detector operable to detect a disengaged state of the power take-off clutch, and wherein said start waiting state of the circuit is attained upon both the power take-off detector detecting disengagement of the power take-off clutch and the neutral detector detecting the neutral position of the transmission.

5. The operation controlling apparatus according to claim 1, wherein said seating detector comprises a switch detecting downward displacement of the seat relative to a frame of the machine, the switch being arranged outside of the seat.

6. The operation controlling apparatus according to claim 5, wherein the seating detector is disposed between the seat and the frame of the machine.

7. An operation controlling apparatus for a passenger operated machine having an engine, a driving transmission and an operator's seat, comprising:

a neutral detector switch coupled to the transmission and operable to detect a neutral position of the driving transmission and any state other than the neutral position, the neutral position being characterized by disengagement of the engine from at least one driving wheel of the machine;

a seating detector operable to detect whether or not an operator of the machine is seated on the operator's seat;

a circuit coupled to the neutral detector and to the seating detector, the circuit having a timer coupled to the seating detector, the circuit having an output coupled to an engine disable means operable to disable the engine when said neutral detector is in a state detecting any position of the transmission other than said neutral position of the transmission and the seating detector continues to detect an unseated state of the operator for more than a predetermined time;

the circuit also being operable to assume a start waiting state when said neutral detector detects said neutral position of the transmission after said predetermined time, the engine disable means maintaining a stopped status of the engine in the start waiting state and preventing starting until the neutral detector detects the neutral position of the transmission and the seating detector detects that an operator of the machine is seated on the seat.

8. The operation controlling apparatus according to claim 7, further comprising a power take-off from the engine associated with a power take-off clutch, and a power take-off detector operable to detect a disengaged state of the power take-off clutch, and wherein said start waiting state of the circuit is attained upon at least one of the power take-off detector detecting disengagement of the power take-off clutch and the neutral detector detecting the neutral position of the driving transmission.

9. The operation controlling apparatus according to claim 8, wherein said seating detector comprises a switch detecting downward displacement of the seat relative to a frame of the machine, the switch being arranged between the seat and the frame.

* * * * *

UNITED STATES PATENT AND TRADEMARK OFFICE
CERTIFICATE OF CORRECTION

PATENT NO. : 5,156,232

DATED : October 20, 1992

INVENTOR(S) : Muroya, Yoshiaki Kotani, Naoya Toida, Kazunobu Sato

It is certified that error appears in the above-identified patent and that said Letters Patent is hereby corrected as shown below:

On the title page: Item [54] and Column 1, line 2,
The title should read --OPERATIONAL CUTOFF FOR PASSENGER CONTROLLED MACHINE-- as per amendment dated December 12, 1990, in Application SN 508,795.

Column 3, line 32, "o" should be changed to read --or--.

Column 5, line 23, delete "status".

Column 5, line 24, after "the" insert --a--.

Column 5, line 25, change "2" to read --21--.

Signed and Sealed this

Seventh Day of December, 1993

Attest:

BRUCE LEHMAN

Attesting Officer

Commissioner of Patents and Trademarks